(12) United States Patent
Dingel et al.

(10) Patent No.: US 6,220,665 B1
(45) Date of Patent: Apr. 24, 2001

(54) EASY ACCESS TUMBLE SEAT WITH INTERATED CHILD SEAT AND TUMBLE LOCKOUT WHEN CHILD SEAT IS DEPLOYED

(75) Inventors: Douglas A. Dingel, Brighton; Omar D. Tame, West Bloomfield, both of MI (US)

(73) Assignee: Magna Interior Systems Inc., Aurora (CA)

(*) Notice: Subject to any disclaimer, the term of this patent is extended or adjusted under 35 U.S.C. 154(b) by 0 days.

(21) Appl. No.: 09/248,625

(22) Filed: Feb. 11, 1999

Related U.S. Application Data

(60) Provisional application No. 60/074,306, filed on Feb. 11, 1998.

(51) Int. Cl.$^7$ ........................................ A47C 1/02
(52) U.S. Cl. ........................ 297/326; 297/238; 297/336; 296/65.03
(58) Field of Search ..................................... 297/326, 331, 297/332, 335, 336, 238; 296/65.03

(56) References Cited

U.S. PATENT DOCUMENTS

| | | |
|---|---|---|
| 5,224,756 | 7/1993 | Dukatz et al. . |
| 5,380,060 | 1/1995 | Sponsler et al. . |
| 5,383,707 | 1/1995 | Osenkowski et al. . |
| 5,449,216 * | 9/1995 | Gierman et al. ............... 297/238 X |
| 5,472,260 | 12/1995 | Czapski et al. . |
| 5,476,305 | 12/1995 | Corkins et al. . |
| 5,558,403 | 9/1996 | Hammoud et al. . |
| 5,707,112 | 1/1998 | Zinn . |

FOREIGN PATENT DOCUMENTS

| | | |
|---|---|---|
| 19514380 | 11/1995 | (DE) . |
| 650864 | 8/1995 | (EP) . |
| 0803398 | 4/1997 | (EP) . |

* cited by examiner

*Primary Examiner*—Laurie K. Cranmer
(74) *Attorney, Agent, or Firm*—Howard & Howard

(57) ABSTRACT

A tumble seat for use in a vehicle including a seat cushion supported on a frame and a seat back connected to the seat cushion. First supports depend from the frame and have a first pivot connection for pivotally attaching the frame to the vehicle. The seat may be rotated about the first pivot connection between an operative position in which the seat cushion is generally horizontal so that an occupant may be seated on the seat and a nonoperative position in which the seat is rotated from the operative position about the first pivot connection. Second supports depend from the frame in spaced relation from the first supports and include ends for attaching to the vehicle when the seat is in the operative position. A latch mechanism is operatively attached to the frame for securing and unsecuring the ends to and from the vehicle when the seat is in the operative position. A lockout mechanism prevents the seat from rotating about the first pivot connection from the operative position to the nonoperative position.

10 Claims, 6 Drawing Sheets

EASY ACCESS TUMBLE SEAT WITH INTERATED CHILD SEAT AND TUMBLE LOCKOUT WHEN CHILD SEAT IS DEPLOYED

RELATED APPLICATION

This patent application claims priority to all the benefits of U.S. Provisional Patent Application No. 60/074,306, filed on Feb. 11, 1998 and entitled "Easy Access Tumble Seat With Integrated Child Seat and Tumble Lockout When Child Seat is Deployed".

TECHNICAL FIELD

The subject invention relates to an automotive seat assembly having an integrated child seat.

BACKGROUND OF THE INVENTION

Tumble seats for automotive vehicles are well known in the art and permit the seat to be rotated forward to facilitate easier access to the cargo or passenger area of the vehicle. A latch mechanism may be actuated to lock the seat down to the vehicle or to permit the tumble seat to rotate forward. Tumble seats without a safety mechanism are capable of being inadvertently actuated thereby rotating forward. Integrated child seats are also well known in the art. Integrated child seats are integral with typical passenger seats and permit the elimination of a separate child car seat which must be installed and removed from the vehicle. The integrated child seat may be positioned flush within a seat back so that an adult occupant may use the seat and then the child seat may be folded down so that it is generally parallel with a lower seat portion, or seat cushion, for suitable use by a child. Combining an integrated child seat with a tumble seat poses a potentially serious safety hazard in that it possible that the tumble seat may be inadvertently actuated thereby rotating forward while a child is seated on the child seat.

SUMMARY OF THE INVENTION

The present invention provides a tumble seat for use in a vehicle which has a frame with a seat attached thereto. The seat includes a seat cushion supported on the frame and a seat back connected to the seat cushion. An integrated child seat is pivotally connected to the seat back and is rotatable between an adult position at least partially abutting the seat back and a child position substantially parallel with the seat cushion. First supports depend from the frame and have a first pivot connection for pivotally attaching the frame to the vehicle. The seat may be rotated about the first pivot connection between an operative position in which the seat cushion is generally horizontal so that an occupant may be seated on the seat and a nonoperative position in which the seat is rotated from the operative position about the first pivot connection. Second supports depend from the frame in spaced relation from the first supports and include ends for attaching to the vehicle when the seat is in the operative position. A latch mechanism is operatively attached to the frame for securing and unsecuring the ends to and from the vehicle when the seat is in the operative position. A lockout mechanism prevents the seat from rotating about the first pivot connection from the operative position to the nonoperative position when the child seat is in the child position.

Accordingly, the tumble seat and integrated child seat of the present invention provides a lockout mechanism that improves the safety of the child by preventing the tumble seat from rotating forward in undesirable situations. The lockout mechanism prevents the tumble seat from inadvertently rotating while the child is seated on the child seat.

DETAILED DESCRIPTION

Referring now more particularly to the drawings, a tumble seat with an integrated child seat tumble lockout is generally indicated at 10 in FIGS. 1A, 1B, 2 and 3. The seat 10 is specifically constructed and arranged to serve as one of the quad which are mounted two by two seats in a van-type vehicle. More specifically, the seat 10 would be the forward seat closest to the side door of the four quad seats. The tumble function is provided to gain easy access to the cargo or passenger area located to the rear of the tumble seat from the door side of the van. The seat 10 shown is for a single sliding door van although the tumble seat is also useful for vans having two rear doors, sliding or otherwise.

Figure 1A:
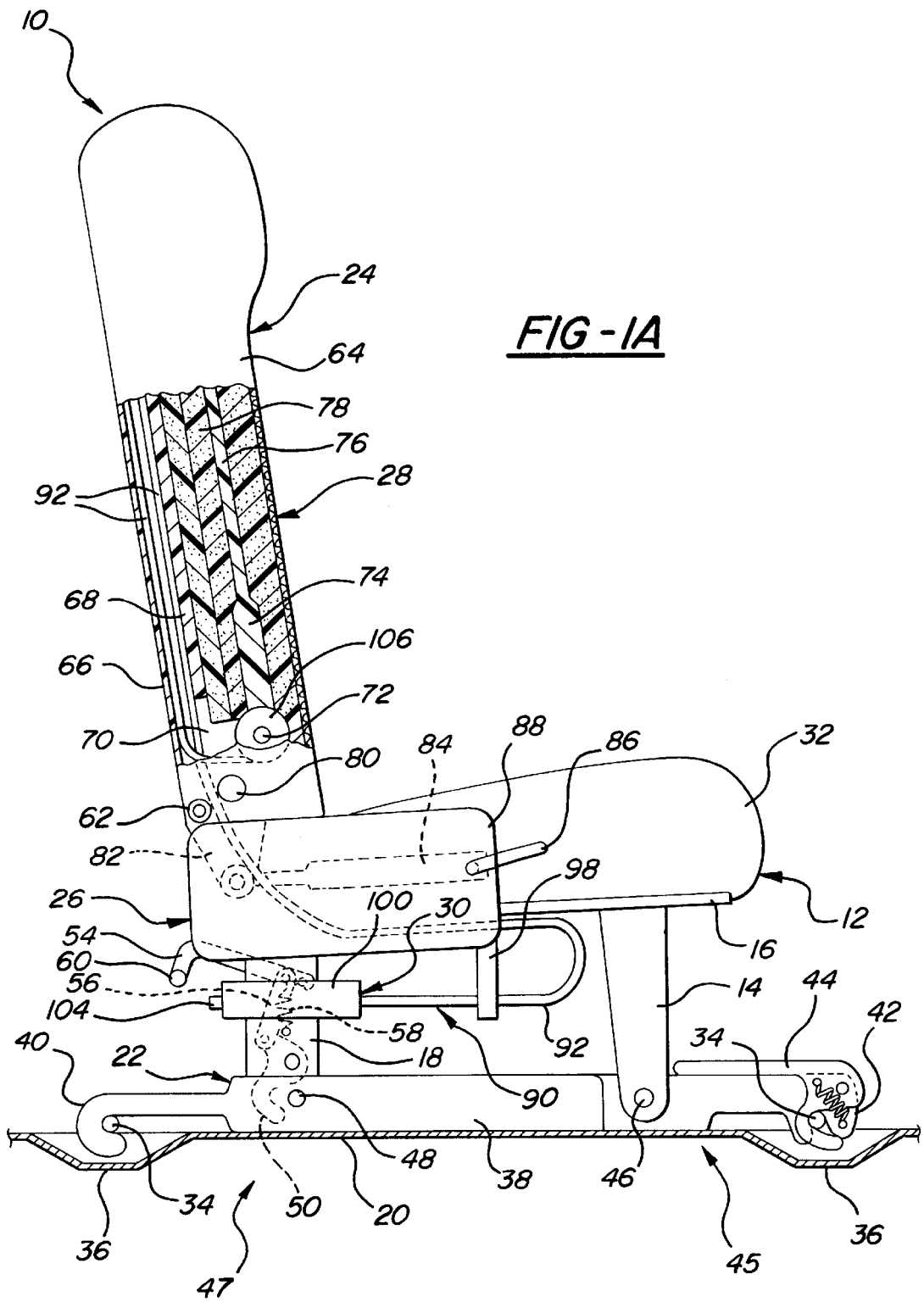
FIG. 1A is a side elevational view, partly in cross-section, of a tumble seat with an integrated child seat tumble lockout assembly embodying the principles of the present invention and showing the seat in its operative position and the integrated child seat in its adult position.
Figure 1B:
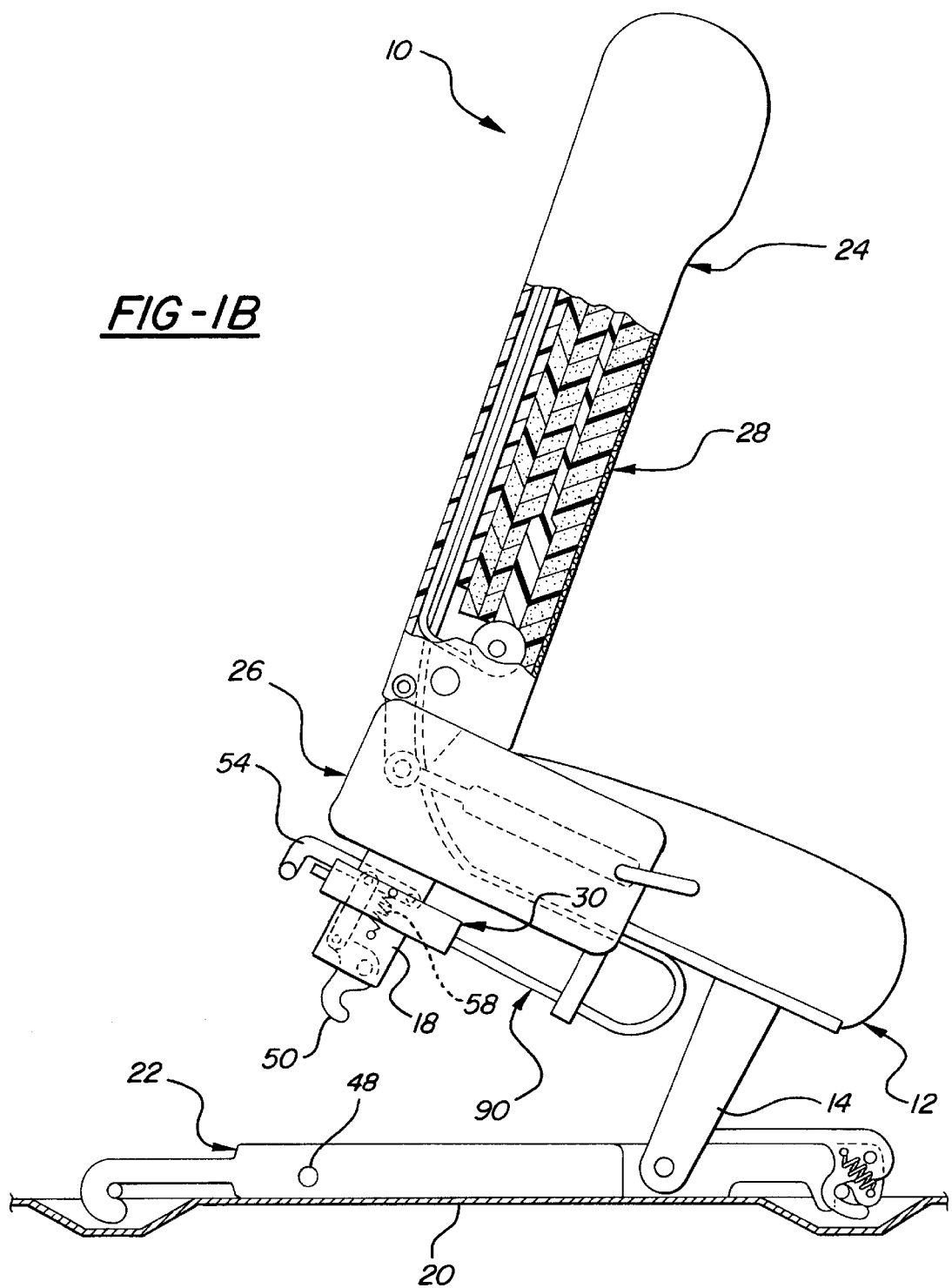
FIG. 1B is a side elevational view similar to FIG. 1A, showing the tumble seat in its nonoperative or tumble position.

As shown in FIG. 1A, the seat 10 includes a seat cushion assembly, or lower portion, 12 supported by a pair of transversely spaced front legs, or first supports, 14 which depend from a forward portion of a frame 16. A pair of transversely spaced rear legs, or second supports, 18 depend from a rearward portion of the frame 16. The front 14 and rear 18 legs at each side of the seat cushion assembly 12 may constitute a side riser assembly which could be formed of a single structure rather than a structure embodying two spaced members.

Figure 2:
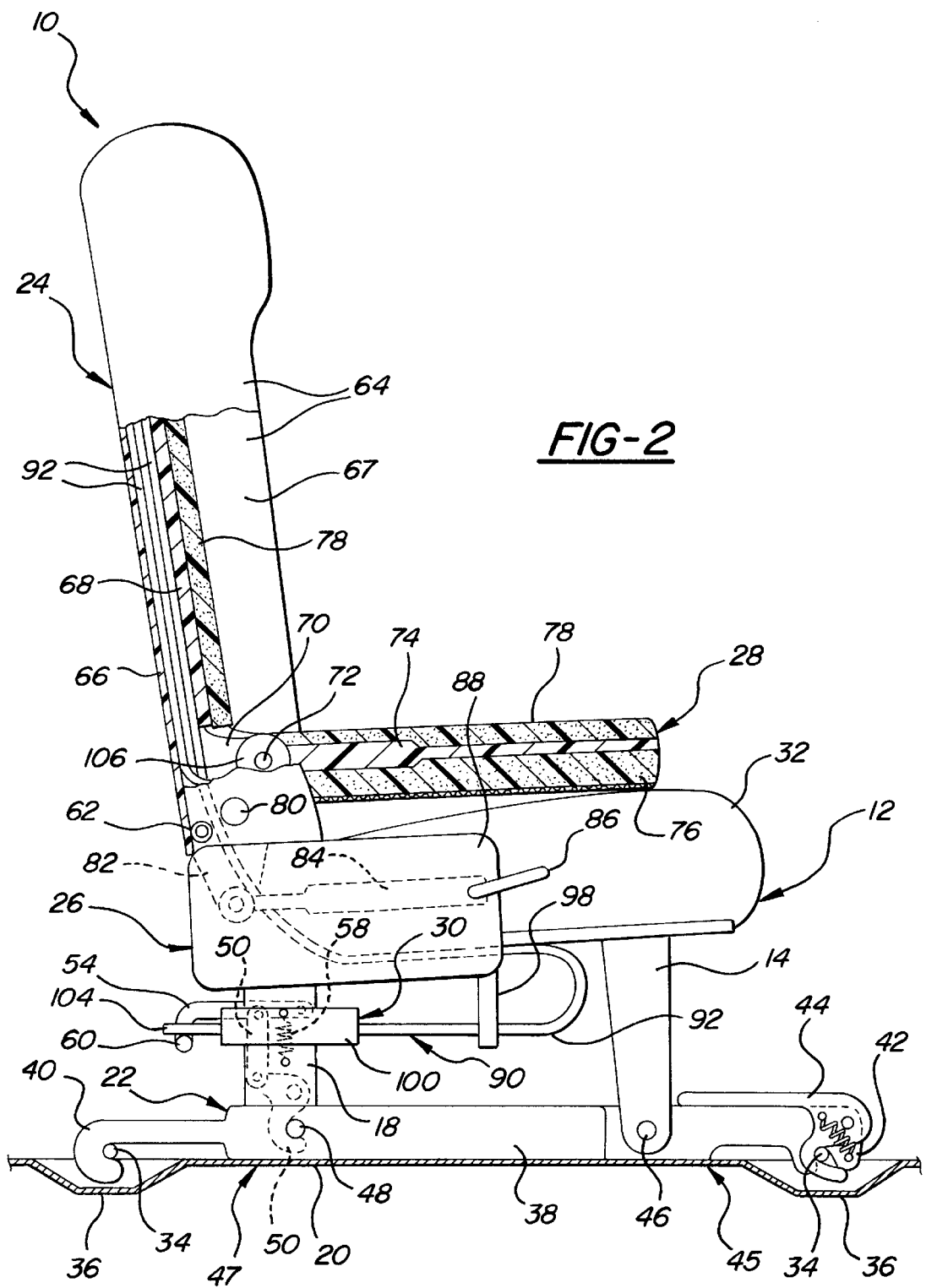
FIG. 2 is a view similar to FIG. 1A, showing the integrated child seat in its child position.

The seat 10 also includes a seat back assembly, or back portion, 24 which is operatively connected to the seat cushion assembly 12 by a seat back mounting assembly 26. The seat back assembly 24 includes an integrated child seat assembly 28 which is normally retained in an adult position, as showing in FIG. 1A, and is deployable from the adult position into a child position, as shown in FIG. 2.

The seat cushion assembly 12 is of any conventional construction and includes the usual trim covered foam cushion 32 suitably mounted on the frame 16.

The supports 14, 18 are connected to the vehicle floor 20 by a floor-mounting assembly 22. The floor-mounting assembly 22 serves to selectively retain the seat 10 in a normal operative position, as shown in FIGS. 1A and 2. Further, the floor mounting assembly 22 provides attaching points and supports to enable the seat 10 to be moved between an operative position (FIG. 1A) and a non-operative or tumble position (FIG. 1B) thereby providing access to the seats rearwardly thereof. Alternatively, the seat 10 may be removably attached directly to the vehicle floor 20.

In accordance with the principles of the present invention, the seat 10 also includes a lock out mechanism 30 for preventing the seat 10 from being moved from its operative position into its tumble position when the child seat assembly 28 is deployed to its child position, as discussed in more detail below.

The floor-mounting assemblies 22 are of the type capable of releasably securing the seat 10 to a pair of fore and aft dog elements, or pins, 34 extending across a pair of wells 36 formed as an integral part of the floor 20. Each floor-mounting assembly 22 includes an elongated fore and aft extending mounting member 38 interposed between the wells. Each mounting member 38 includes a rear hook portion 40 for hooking around the rearward pin 34 and a downwardly opening U-shaped forward portion 42 for attachment to the forward pin 34. A spring-biased manually movable locking member 44 is pivotally mounted on the forward portion 42 for locking and unlocking the floor mounting assembly 22 to the floor 20.

Figure 3:
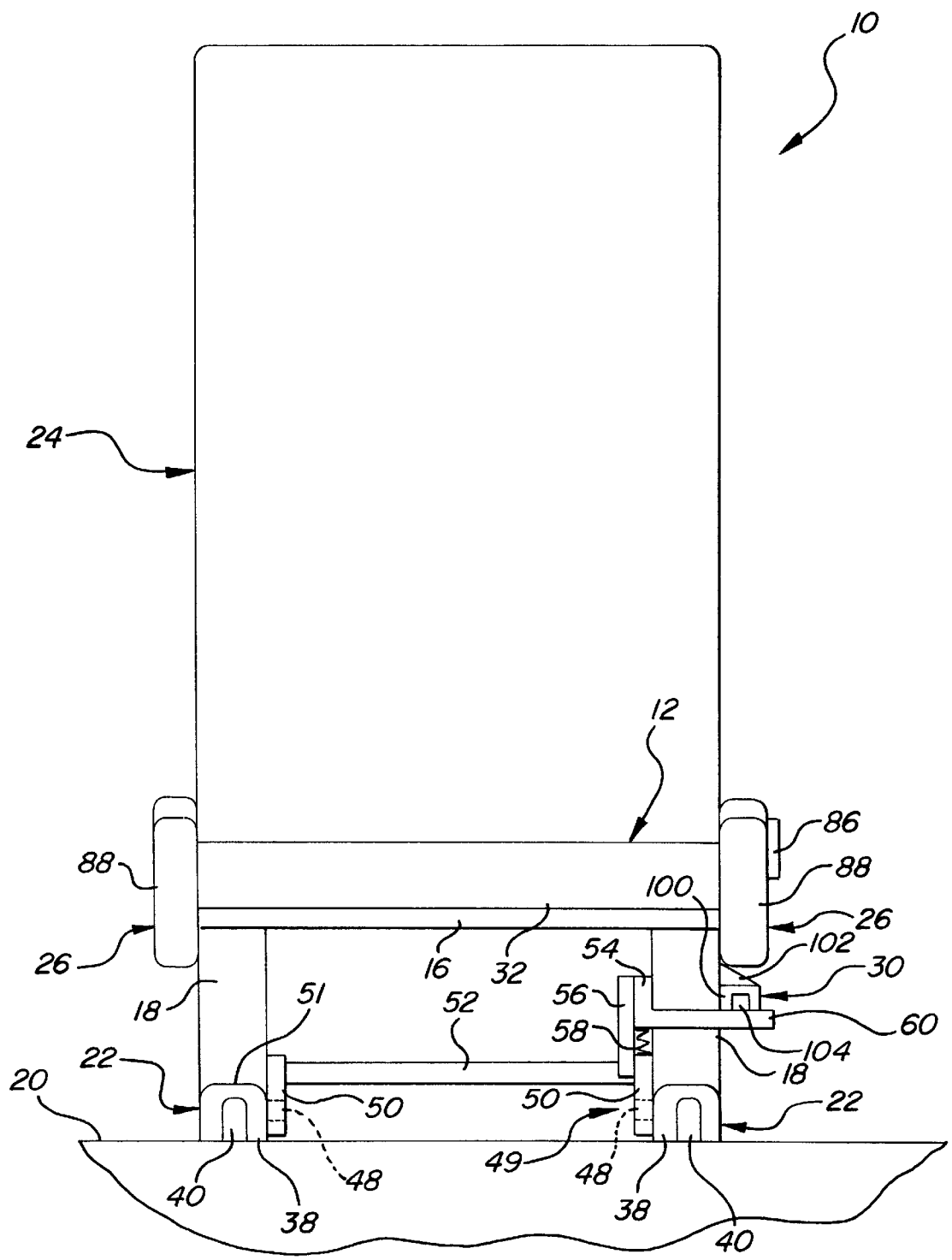
FIG. 3 is a rear elevational view of the tumble seat shown in FIG. 1A.

Each mounting member 38 has a forward recessed portion 45 to which the front leg 14 is pivotally attached by a transversely extending pivot pin 46. Referring to FIGS. 1A, 2 and 3, the rearward portion 47 of each mounting member 38 has a latch-engaging pin 48 extending transversely from the inner side 49 thereof. Each rear leg 18 rests on the upper surface 51 of the associated mounting member 38 when the seat 10 is in the operative position. A releasable latch member 50 is pivotally attached to the inner side 49 of each leg 18 for securing to the latch pin 48. The two latch members 50 are fixedly interconnected by a cross bar 52 to move together from the latched position (FIG. 2) to a released position (FIG. 1A) in which the latch members 50 are clear of the latch pin 48.

In order to move the latch members 50 together, there is provided a single manually operable handle 54. The handle 54 is pivotally connected to the inside 49 of the right rear leg 18 above the latch member 50. A linkage 56 interconnects the handle 54 and the latch member 50 so that when the handle 54 is raised, the latch member 50 is pivoted out of engagement with the latch pin 48. A coil spring 58 is connected to the handle 54 and the leg 18 to bias the handle 54 and latch member 50 to the latched position.

The handle 54 includes an outer portion 60 which extends transversely from the handle 54. The outer portion 60 may be grasped manually and moved upwardly to move the latch members 50 from the latched position to the released position. When the latch members 50 have cleared the pins 48, the outer portion 60 and handle 54 are in a released position.

Returning now to FIG. 2, the seat back assembly 24, with the integrated child seat assembly 28, may embody any of the well-known constructions presently known in the art. In general, the seat back assembly 24 includes a frame 62 covered by a pair of transversely spaced trim covered cushions 64 and a rear cover member 66. The seat back cushion assembly 24 also includes a recessed pocket 67 within which the child seat assembly 28 is received and stowed.

The child seat assembly 28 includes a panel 68 suitably fixed to the frame 62. Extending forwardly from the lower end of the panel 68 are a pair of transversely spaced pivot portions 70. Pivotally mounted in the pivot portions 70 is a shaft, or second pivot connections, 72 about which the child seat 28 pivots. The child seat 28 includes a frame 74 covered by a cushion 76. As mentioned above, the child seat 28 is rotatable about the second pivot connection 72 between the adult position (FIG. 1A) and the child position (FIG. 2).

The child seat assembly 28 also includes a hingeable pad 78 which is removably mounted on the forward surface of the panel 68 and the frame 74. When the child seat assembly 28 is deployed into its child position, the portion of the pad 78 attached to the frame 74 defines a cushioned seat for a child, while the portion of the pad 78 attached to the panel 68 defines a cushioned seat back.

Preferably, the back panel of the pad 78 is formed of loop material and strips of hook material are fixed to the panel 68 and frame 74 to effect the removable securement of the pad 78 thereto. It will also be understood that the child seat assembly 28 may include a five-point harness assembly and may include other components such as a movable child's head rest.

The seat back mounting assembly 26 may assume any well-known construction. The seat back mounting assembly 26 is of the type that provides both for a range of reclining movements as well as a forward dumping movement. These movements of the seat back assembly 24 with respect to the seat cushion assembly 12 are independent of the tumble movement. When moved from the operative to the tumble position, the seat cushion 12 and seat back 24 rotate together. Since the manner in which the seat back cushion assembly 24 is mounted with respect to the seat cushion assembly 12 is independent of the tumble movement, the mounting assembly 26 could be simply a fixed connection. Likewise, the mounting assembly 26 could provide only for reclining movements or only for a dumping movement. In the embodiment shown, seat cushion 12 and seat back 24 are pivotally connected by spaced pivot pins 80 enabling the seat back assembly 24 to both recline and dump about a single pivotal axis, however, a dual axis may also be used.

To provide the reclining and dumping features, the frame structure of the seat back assembly 24 has a rigid arm 82 extending downwardly from the pivot pin 80 at one side. The lower end of the arm 82 is pivotally connected to one end of a linear adjusting mechanism 84 of any suitable type. The adjusting mechanism 84 includes a control lever 86 which extends outwardly with respect to a cover member 88 provided on both sides of the seat cushion assembly 12. It may also be desirable to provide for a lockout device to disable the recline and dump features when the child seat is deployed.

Figure 4:
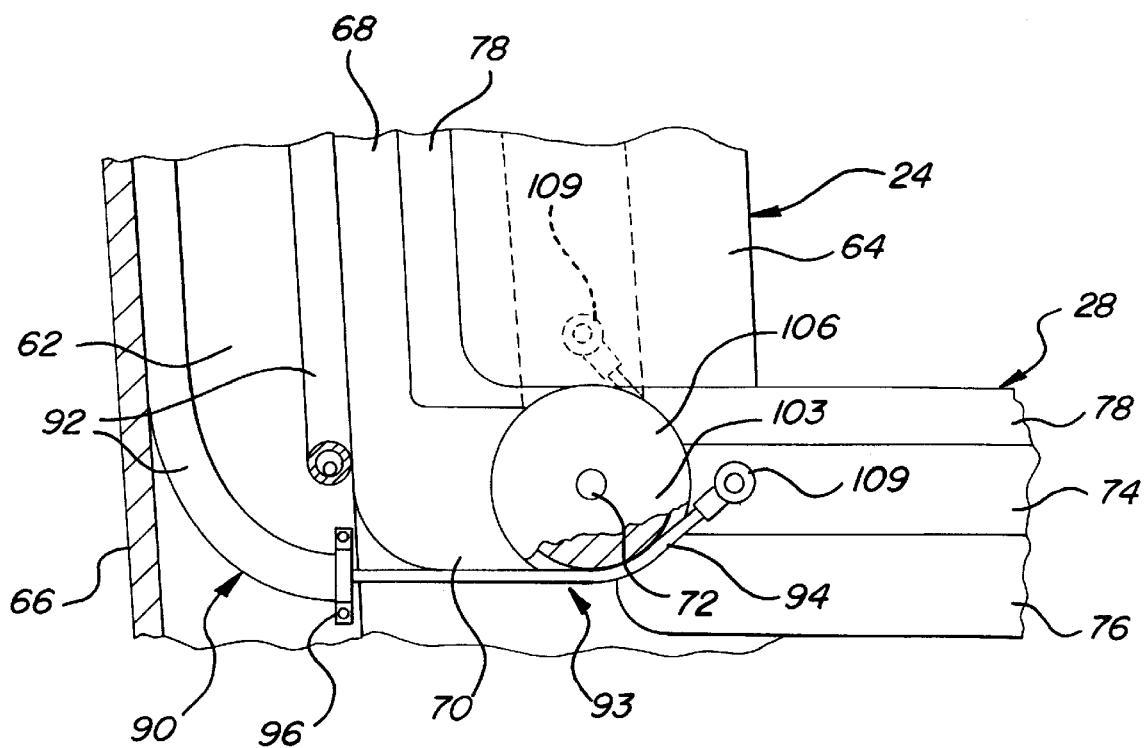
FIG. 4 is a fragmentary detailed view of a first end of the Bowden wire assembly connected to the child seat in its deployed child position.
Figure 5:
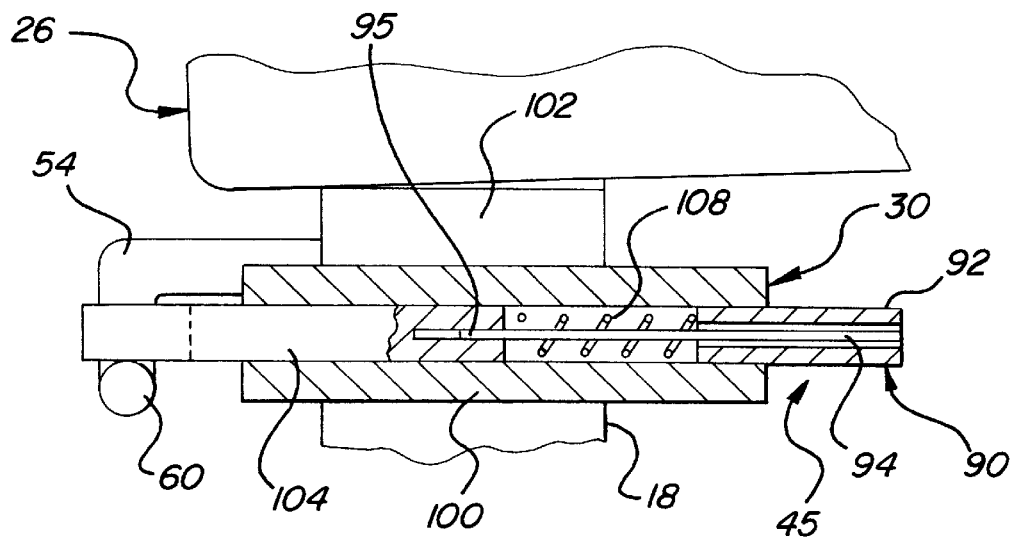
FIG. 5 is a fragmentary detailed view of a second end of the Bowden wire assembly shown in FIG. 4 connected to a lockout assembly, showing a lockout pin in solid lines in its locked position and in dotted lines in its unlocked position.

Referring now to FIGS. 4 and 5, a lockout mechanism 30 is deployed to ensure that the seat will not tumble forward while a child is seated in the child seat 28. The lockout mechanism 30 is interconnected with the child seat 28 such that the position of the child seat 28 is communicated to the lockout mechanism 30. The lockout mechanism 30 includes a conventional Bowden wire assembly 90 that interconnects the lockout mechanism 30 and child seat 28, however, any suitable linkage may be used. The wire assembly 90 includes a flexible sheath or tube 92 which slidably receives a wire or cable 94.

As best shown in FIG. 4, a first end 93 of the flexible sheath 92 is fixed to a bracket 96 suitably fixed to the frame 62 of the seat back assembly 24. The flexible sheath 92 loop upwardly within the seat back assembly 24 and is fed downwardly so as to pass under the frame 16 of the seat cushion assembly 12. At the forward portion of the seat cushion assembly 12, the flexible sheath 92 is looped around and extends rearwardly where it is fixed to the righthand cover 88 by a bracket 98. The rearwardly extending extremity or second end of the flexible sheath 92 is fixed to the forward end of a lockout pin housing 100.

As best shown in FIG. 5, the lockout pin housing 100 is fixed to the exterior surface of the righthand rear leg 18 and may be reinforced by a brace 102. Slidably mounted within the lockout pin housing 100 is a lockout pin 104 which moves from a locked position overlying the handle 60 when the child seat 28 is in the child position to an unlocked position when the child seat is in the adult position. The forward end of the lockout pin 104 is connected to the second end 95 of the cable 94 extending outwardly from the adjacent end of the flexible sheath 92.

The first end 93 of the cable or wire 94 extends outwardly from the flexible sheath 92 and is trained under first semicircular portion 103 of a grooved roller 106 which is fixed to the shaft 72 so as to be moved with the frame structure 74. It is also possible to pivot the frame structure 74 of the child seat assembly 28 about the pivot 72 and to have the roller 106 also pivoted thereon. After passing under the grooved surface of the roller 106, the first end of the cable or wire 94 is fixed to a pin 109 extending radially outwardly from the frame structure 74 of the movable cushioned seat of the child seat assembly 28.

It can be seen that, when the movable cushioned seat of child seat assembly 28 is moved into its folded-up adult position as shown in FIG. 1, the wire or cable 94 will be moved so that the first end 93 extends from the sheath 92 and the second end 95 moves into the sheath 92 so that the lockout pin 104 will be retracted and retained in the dotted line position as shown in FIG. 5.

When the movable cushioned seat of the child seat assembly 28 is deployed into its child position, the cable 94 is moved in the opposite direction which has the effect of moving the lockout pin 104 in a locked position to prevent upward movement of the handle member 60 It will be understood that a biasing spring 108 can be used between the lockout pin 104 and the flexible sheath 92 within the housing 100 to assist in this movement.

Figure 6:
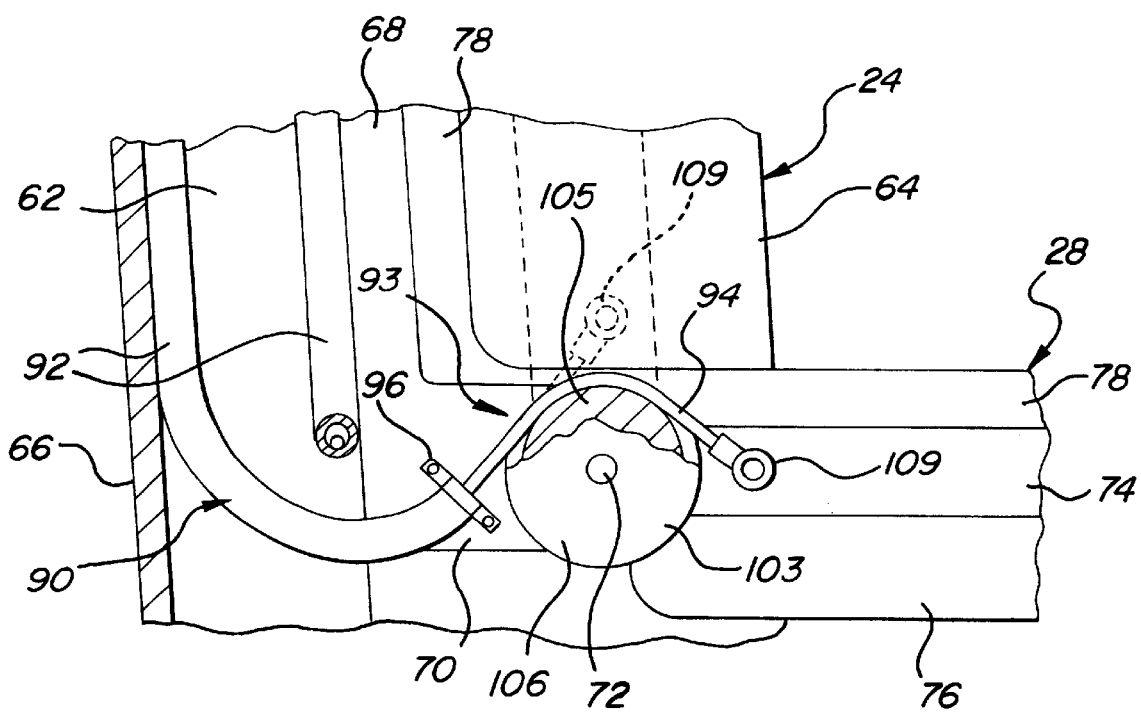
FIG. 6 is a fragmentary detailed view similar to FIG. 4 of an alternative embodiment of the present invention.
Figure 7:
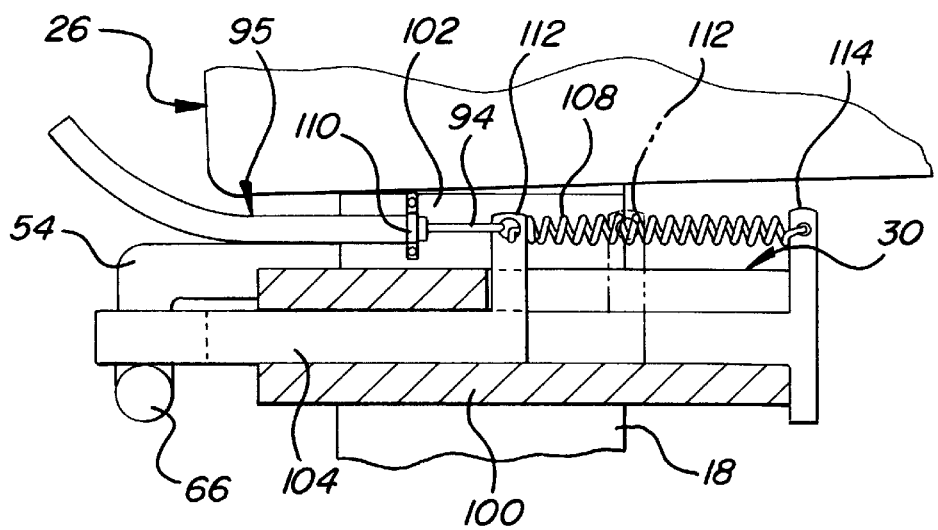
FIG. 7 is a fragmentary detailed view similar to FIG. 5 of an alternative embodiment of the present invention showing the other end of the Bowden wire assembly shown in FIG. 6.

FIGS. 6 and 7 illustrate a lockout mechanism 30 according to an alternative embodiment. Where applicable, structures and components in the second embodiment which are similar to structures and components in the first embodiment will be labeled with the same reference numerals.

The first end 93 of the flexible sheath 92 is fixed to the frame 62 of the seat back assembly 24 by a bracket 96. The flexible sheath 92 loops upwardly within the seat back assembly 24 and is passed downwardly to a bracket 110. The bracket 110 supports the sheath 92, and second end 95 of the wire 94 is fixed to an attaching member 112 extending radially from the lockout pin 104.

As best shown in FIG. 7, the lockout pin housing 100 is fixed to the exterior surface of the right hand rear leg 18 as by welding or other suitable attaching means. The lockout pin 104 is slidably mounted within the lockout pin housing 100. The lockout pin 104 moves from a locked position overlying the handle portion 60 when the child seat 28 is in the child position and is in an unlocked position when the child seat 28 is in the adult position.

The first end 93 of the wire 94 extends outwardly from the sheath and is trained over a second semicircular portion 105 of the grooved roller 106 which is fixed to the shaft 72 so as to move with the frame 74. After passing over the grooved surface of the roller 106, the opposite end of the wire 94 is fixed to a pin 109 extending radially outwardly from the frame 74 of the movable cushioned seat of the child seat assembly 28.

It can be seen that, when the movable cushioned seat of the child seat assembly 28 is moved into its folded-up adult position, as shown in FIG. 1, the first end 93 of the wire 94 attached to the frame 74 will be moved into the sheath 92 and the second end 95 will extend outwardly with respect to the sheath 92, thereby moving the lockout pin 104 forwardly to the unlocked position shown by dotted lines in FIG. 7.

When the moveable cushioned seat of the child seat assembly 28 is deployed into its child position, the wire 94 is moved in the opposite direction, thereby moving the lockout pin 104 rearwardly from its unlocked position to its locked position wherein the lockout pin 104 prevents upward movement of the handle member 60. It is also contemplated that a biasing spring 108 may be used between the attaching member 112 of the lockout pin 104 and an attaching member 114 extending radially with respect to the lockout pin mounting member 100.

The lockout mechanism 30 ensures that the control handle portion 60 cannot be actuated unless the child seat has been folded up into its adult position. It will also be understood that the present invention contemplates disabling the releasing mechanism for the tumble seat other than by positively preventing the movement of the control handle, as, for example, by allowing the control handle to be moved but selectively preventing movement of the latch members 50 in response to the handle movement.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than a specifically described.

What is claimed is:

1. A tumble seat for use in a vehicle comprising:

a frame;

a seat cushion supported on said frame and a seat back connected to said seat cushion;

an integrated child seat pivotally connected to said seat back and being rotatable between an adult position at least partially abutting said seat back, and a child position substantially parallel with said seat cushion;

first supports depending from said frame having a first pivot connection for pivotally attaching said frame to the vehicle, said frame being rotatable about said first pivot connection between an operative position in which said seat cushion is generally horizontal and a nonoperative position in which said frame is rotated from said operative position about said first pivot connection;

second supports depending from said frame in spaced relation from said first supports, said second supports having ends for attaching to the vehicle when said frame is in said operative position;

a latch mechanism operatively attached to said frame for securing and unsecuring said ends of said second supports to and from the vehicle when said frame is in said operative position; and a lockout mechanism for preventing said frame from rotating about said first pivot connection from said operative position to said nonoperative position when said child seat is in said child position.

2. The tumble seat as set forth in claim 1 wherein said integrated child seat is pivotally mounted to a second pivot connection for pivotally attaching said child seat to said seat back, said child seat being rotatable about said second pivot connection between said adult position in which said child seat is received within a pocket in said seat back and said child position in which said child seat is generally parallel with said seat cushion.

3. The tumble seat as set forth in claim 2 wherein said lockout mechanism engages said latch mechanism for preventing said latch mechanism form unsecuring said ends from the vehicle when in said operative position and said child seat is in said child position.

4. The tumble seat as set forth in claim 3 wherein said latch mechanism further includes a latch for engaging the vehicle and securing and unsecuring said ends to the vehicle, and a handle for actuating said latch, and wherein said lockout mechanism further includes a lockout assembly having a pin engageable with said handle for preventing said handle from being actuated.

5. The tumble seat as set forth in claim 4, wherein said lockout mechanism further includes a cable having first and second ends interconnecting said child seat and said pin respectively for transmitting said child seat positions to said pin.

6. The tumble seat as set forth in claim 5, wherein said lockout mechanism further includes a roller attached at said second pivot connection, and said roller includes a perimeter having first and second portions with an annular groove for receiving a segment of said cable.

7. The tumble seat as set forth in claim 6, wherein said lockout assembly further includes a housing operatively attached to said frame for supporting said pin and said second end of said cable, and a spring for biasing said pin in one of a locked position in which said pin is engaged with said handle and an unlocked position in which said pin is disengaged from said handle.

8. The tumble seat as set forth in claim 7 wherein said segment is received within said annular groove of said first portion and said spring biases said pin to said locked position.

9. The tumble seat as set forth in claim 7 wherein said segment is received within said annular groove of said second portion and said spring biases said pin to said unlocked position.

10. The tumble seat as set forth in claim 1 further comprising a floor-mounting assembly for attaching and removing said frame to the vehicle including said first pivot connection of said first supports and receiving said ends of said second supports.

\* \* \* \* \*